US008527944B2

(12) United States Patent
Teng et al.

(10) Patent No.: US 8,527,944 B2
(45) Date of Patent: Sep. 3, 2013

(54) METHOD AND APPARATUS FOR NATIVE METHOD CALLS

(75) Inventors: Qiming Teng, Beijing (CN); Feng Wang, Beijing (CN); Haichuan Wang, Beijing (CN); Xiao Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 12/689,300

(22) Filed: Jan. 19, 2010

(65) Prior Publication Data

US 2010/0186001 A1 Jul. 22, 2010

(30) Foreign Application Priority Data

Jan. 21, 2009 (CN) .......................... 2009 1 0003244

(51) Int. Cl.
*G06F 9/44* (2006.01)
(52) U.S. Cl.
USPC .......................................................... 717/110
(58) Field of Classification Search
USPC .......................................................... 717/110
See application file for complete search history.

(56) References Cited

U.S. PATENT DOCUMENTS

| 6,066,181 | A | 5/2000 | DeMaster | |
|---|---|---|---|---|
| 6,549,959 | B1 * | 4/2003 | Yates et al. | 710/22 |
| 6,754,890 | B1 * | 6/2004 | Berry et al. | 717/128 |
| 6,886,157 | B2 | 4/2005 | Long et al. | |
| 7,039,911 | B2 | 5/2006 | Chase et al. | |
| 7,266,810 | B2 | 9/2007 | Karkare et al. | |
| 7,403,948 | B2 * | 7/2008 | Ghoneimy et al. | 707/792 |
| 2002/0144241 | A1 * | 10/2002 | Lueh | 717/136 |
| 2004/0259118 | A1 * | 12/2004 | Macevicz | 435/6 |
| 2008/0163265 | A1 | 7/2008 | Flora | |

FOREIGN PATENT DOCUMENTS

CN 1770148 5/2006

OTHER PUBLICATIONS

JVM™ Tool Interface version 1.2; "http://docs.oracle.com/javase/7/docs/platform/jvmti/jvmti.html", Sep. 5, 2007.*
Franz, "A Comprehensive Context for Mobile-Code Deployment", Sep. 30, 2004, University of California.*

* cited by examiner

*Primary Examiner* — Anna Deng
*Assistant Examiner* — Junchun Wu
(74) *Attorney, Agent, or Firm* — Ido Tuchman; E. Dwayne Nelson

(57) ABSTRACT

A method and apparatus for a native method call. The method comprises: generating, in response to a native method call-associated event, a template copy from a generic template for processing the native method call; filling information required for processing the native method call in corresponding locations in the template copy; and changing a code execution flow to execute the template copy. When a native method is called, the native method is processed by dynamically inserting the template copy in the execution path at the assembly level.

18 Claims, 6 Drawing Sheets

METHOD AND APPARATUS FOR NATIVE METHOD CALLS

CROSS REFERENCE TO RELATED APPLICATION

This application claims priority under 35 U.S.C. 119 from Chinese Patent Application 200910003244.4, filed Jan. 21, 2009, the entire contents of which are incorporated herein by reference.

BACKGROUND OF THE INVENTION

1. Field of the Invention

The present invention relates to a profiling technology for software, and in particular, relates to a method and apparatus for profiling native method calls.

2. Description of Relevant Art

By tracing executive processes of an application program, various performance parameters in the execution process can be obtained, so as to locate program performance bottlenecks and then optimize the application program accordingly. The technology on which such techniques are based is referred to as profiling technology.

Native method is one directly running on a local hardware platform without interpretation by a Virtual Machine (VM). Typically, the native method can be used to directly manipulate computer hardware, improve program execution performance, reuse legacy code, etc. In an application such as Java application, native method calls are quite popular, mainly because many functions have to be implemented by native methods. For example, I/O implementation of object serialization for distributed computing, communication on high speed networks (critical links in multi-tiered applications), Java Machine (JVM) framework, mathematical calculation and etc, their implementations all rely on use of native methods.

It has been practically proved that in the case of using native methods, it is highly likely that application bottlenecks reside either in native codes or at native layer. Thus, profiling native method calls are indispensable in profiling application programs.

In the prior art, there have already been several technologies for profiling native functions, one being bytecode-level instrumentation based technology, and the other being JVM Tool Interface (JVMTI) method level event tracing technology.

The bytecode-level instrumentation based technology can be further divided into a static instrumentation and a dynamic instrumentation. In the static instrumentation, all JDK classes and application classes are bytecode instrumented before the application is executed. Since the static bytecode instrumentation requires performing a class search, the instrumentation process takes a rather long time, especially for a large application program, which takes a much longer time. For the static instrumentation, the bytecode is instrumented before the application program is executed, and is unable to profile dynamically loaded libraries during the process of executing the application program. Further, there is another drawback, namely, when using the static instrumentation, it requires maintaining two collections of classes, one being an instrumented collection of classes, and the other being an original collection of classes.

Different from the static instrumentation, in the dynamic instrumentation, the class is bytecode instrumented when being loaded. However, there are still some technology constraints to the dynamic instrumentation approach. For example, some caller codes are not allowed to be changed, and some calling method codes are already loaded before the bytecode gets instrumented, which will cause it to be unable to profile these calling method codes. Further, modifying these classes dynamically will have great impact on the behavior and performance of class loaders and Just-In-Time (JIT) compilers, such as notably increasing system overhead, which is not desired.

On the other hand, the JVMTI method level event tracing technology provides callbacks to methodEntry and methodExit events, thus the function "IsMethodNative( )" defined in the JVMTI specification can be used to check whether a method is a native one. Compared with the bytecode instrumentation, this approach is simple and easy to implement. However, since the JVMTI method level event tracing technology needs capturing all methods during the running process of an application program and needs performing determination on the methods, the system overhead becomes significant and the system may even slow down 100-1000 times, thereby notably affecting the system performance.

Besides the above-mentioned technologies, there is another known technology to profile the native method calls. For example, the current JVMTI provides a native method call-associated event, namely a NativeMethodBind event as shown below:

The NativeMethodBind event is an event where the definition of native method in the Java program is bound together with the address of a specific native method code, which is typically fired when the native method is called at the first time. Each time the NativeMethodBind event is started, some important information can be returned through parameters defined in the event. For example, "thread" can return the thread requesting for binding, "method" can return the bound method, and "address" can return the address of the bound native method. Besides, if "new_adress_ptr" is set, the VM will bind the native method call to the code address assigned by the new_address_ptr.

In this way, the address "address" of the bound native method can be obtained from this event. Further, as shown in FIG. 1, by setting the new address parameter new_address_ptr as the address of for example the profiling code, the address of the native method in the Java input/output file stream is replaced with the address of the profiling code, thereby executing the profiling code and profiling the native method call.

If this mechanism is used, it is necessary to provide an associated proxy or a wrapper to each native method, so as to perform profiling task and call the native method. If the associated proxy is executable in a proper way, a better result can be achieved, with trivial influence on the performance of the system when the application is running. However, in practice, parameter type and return type of each native method are different, thus it is necessary to implement the above replacement, and each associated proxy should have the exactly same signature as the method to be profiled. But based on the current technology, it is unable to predict the signature of a dynamically loaded method, thus it is impractical in real-life applications.

SUMMARY OF THE INVENTION

According to one aspect of the present invention, a method for profiling a native method call is provided. The method includes the steps of: generating, in response to a native method call-associated event, a profiling template copy from a generic profiling template for the native method call; filling information required for profiling the native method call in corresponding locations in the profiling template copy; and changing a code execution flow to execute the profiling template copy.

According to another aspect of the present invention, an apparatus is provided for profiling a native method call. The apparatus includes: copy generating means for generating, in response to a native method call-associated event, a profiling template copy from a generic profiling template for the native method call; information filling means for filling information required for profiling the native method call in corresponding locations in the profiling template copy; and flow changing means for changing a code execution flow to execute the profiling template copy.

According to the present invention, when a native method is called, the native method is profiled by dynamically inserting the profiling template copy in the execution path at the assembly level. As compared to the prior art, it is unnecessary for the present invention to provide an associated proxy for each native method, thus it has a high feasibility and little negative influence on the system performance.

BRIEF DESCRIPTION OF THE DRAWINGS

The above and other features of the present invention will become more apparent from the following detailed description of embodiments of the present invention, which is taken in conjunction with the accompanying drawings. Like reference numerals are used to indicate like or similar components throughout the accompanying drawings, in which.

DESCRIPTION OF THE PREFERRED EMBODIMENTS

Hereinafter, a method and system for profiling a native method call according to the present invention is described in detail with reference to the accompanying drawings.

Figure 1:
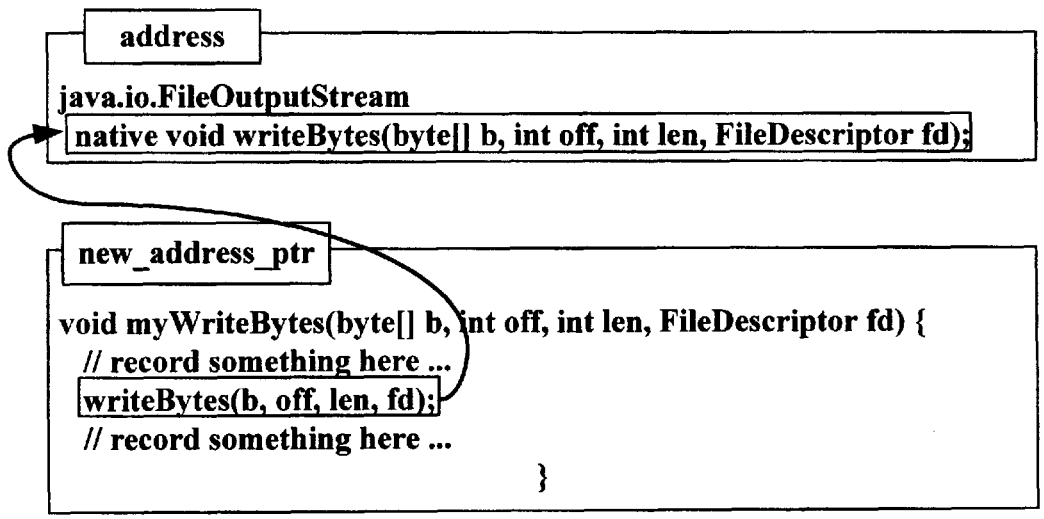
FIG. 1 is a diagram showing replacing a native method address with a new address parameter in a NativeMethodBind event provided by JVMTI.
Figure 2:
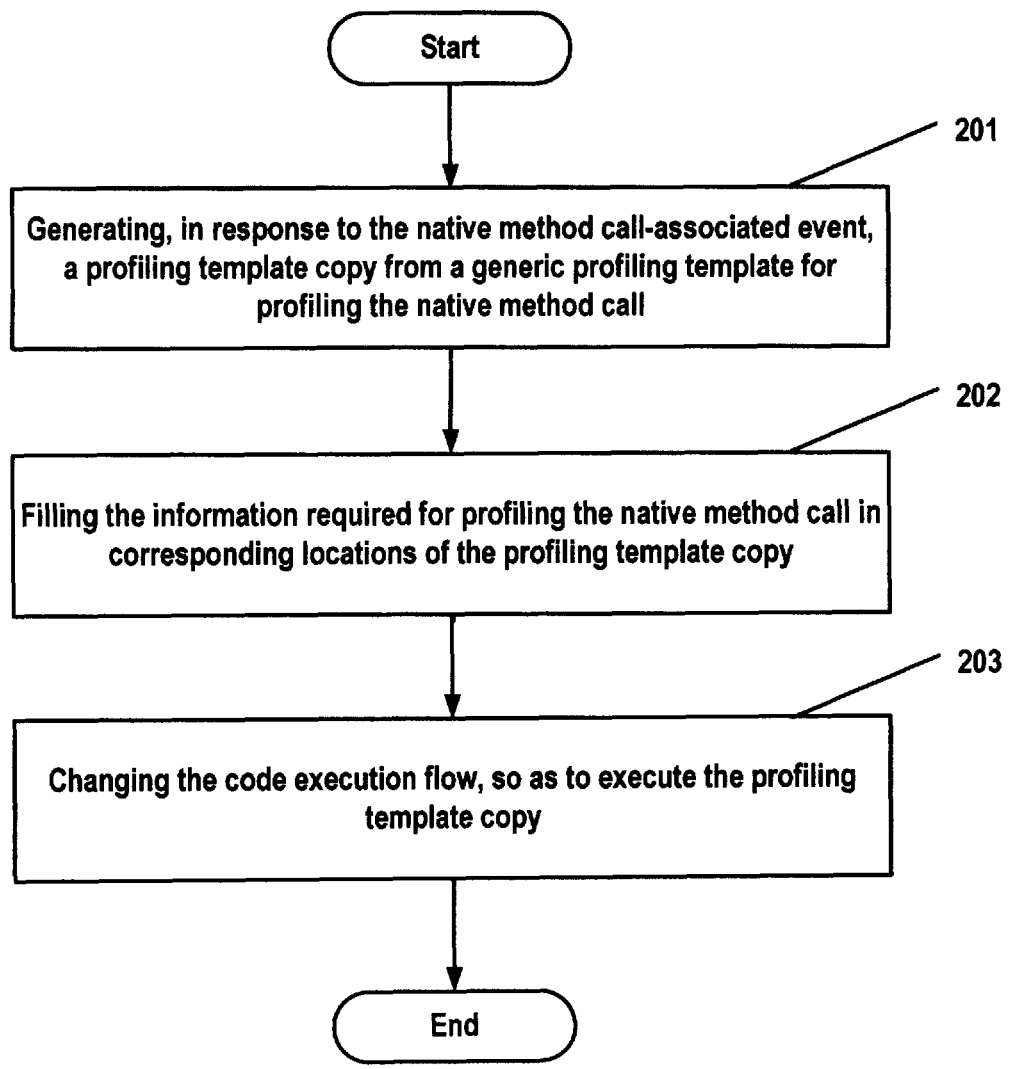
FIG. 2 is a flow chart of the method for profiling a native method call according to an embodiment of the present invention.

First, an embodiment according to the method of the present invention is described with reference to FIG. 2. FIG. 2 is a flow chart of the method for profiling a native method call according to an embodiment of the present invention.

As shown in FIG. 2, at step 201, a profiling template copy is generated from a generic profiling template for profiling the native method call in response to a native method call-associated event.

In a Java virtual machine, after the calling method calls the native method, the address of the native method will be bound, and at this time a native method call-associated event, such as the above NativeMethodBind event, will be started.

It should be noted that in the context of the present invention, the NativeMethodBind event will be taken as an example to describe an embodiment of the present invention. However, besides the above NativeMethodBind event, any other native method call-associated event which is capable of providing the address of the native method can also achieve the objectives of the present invention. Further, besides the Java virtual machine, in other environments in which native method call exists, the event fired when calling the native method can be an event similar to the NativeMethodBind event, or other native method call-associated event which is capable of providing the address of the native method.

After the native method call-associated event is fired, a profiling template copy can be generated from a generic profiling template for profiling the native method call.

According to the method of the present invention, a generic profiling template for profiling a native method call is provided for all native methods. When the native method call-associated event is started, a profiling template copy for the native method call is duplicated from the generic profiling template. The profiling template copy is a copy of the generic profiling template, thus they are completely identical in form. What's different is that the generic profiling template will be continuously stored, whereas the profiling template copy is dedicated to a particular native method, and after the profiling is completed, the space for storing the profiling template copy will be released.

For the sake of explanation, an example for a generic profiling template is provided as below. It should be noted that the example provided here is only for exemplary purpose, and the present invention is not limited thereto and can have many variations.

The example of a generic profiling template:

```
Prolog Template:
static unsigned char prologTemplate[ ] = {
/* 0 */ 0x50, 0x52, 0x53, 0x8b, 0x1d, 0x00, 0x00, 0x00,
/* 8 */ 0x00, 0x85, 0xdb, 0x74, 0x34, 0x8b, 0x44, 0x24,
/* 10 */ 0x0c, 0xa3, 0x00, 0x00, 0x00, 0x00, 0xb8, 0x00,
/* 18 */ 0x00, 0x00, 0x00, 0x89, 0x44, 0x24, 0x0c, 0x0f,
/* 20 */ 0x31, 0xa3, 0x00, 0x00, 0x00, 0x00, 0x89, 0xd0,
/* 28 */ 0xa3, 0x00, 0x00, 0x00, 0x00, 0x68, 0x00, 0x00,
/* 30 */ 0x00, 0x00, 0xbb, 0x00, 0x00, 0x00, 0x00, 0xff,
/* 38 */ 0x13, 0x83, 0xc4, 0x04, 0x5b, 0x5a, 0x58, 0xe9,
/* 40 */ 0xfc, 0xff, 0xff, 0xff
};
Epilog Template:
static unsigned char epilogTemplate[ ] = {
    /* 0 */ 0x6a, 0x00, 0x50, 0x52, 0x53, 0x0f, 0x31, 0xa3,
    /* 8 */ 0x00, 0x00, 0x00, 0x00, 0x89, 0xd0, 0xa3, 0x00,
    /* 10 */ 0x00, 0x00, 0x00, 0xa1, 0x00, 0x00, 0x00, 0x00,
    /* 18 */ 0x89, 0x44, 0x24, 0x0c, 0x68, 0x00, 0x00, 0x00,
    /* 20 */ 0x00, 0xbb, 0x00, 0x00, 0x00, 0x00, 0xff, 0x13,
    /* 28 */ 0x83, 0xc4, 0x04, 0x5b, 0x5a, 0x58, 0xc3
};
```

The example provided above shows a machine code-level generic prolog template and epilog template. To make the example of the generic profiling template easier to understand, the assembly level codes corresponding thereto and their corresponding explanations are specified in the following table 1 and table 2.

TABLE 1 assembly codes of the prolog template and the corresponding explanations

Saving registers

```
/*
```

| *0 | 50 | push | %eax | Saving eax register |
| --- | --- | --- | --- | --- |
| *1 | 52 | push | %edx | Saving edx register |
| *2 | 53 | push | %ebx | Saving ebx register |

Checking whether the profiling switch is on or not

| *3 | 8b 1d 00 00 00 00 | mov | active,%ebx | Placing the value of the variant 'active' in the ebx register |
| --- | --- | --- | --- | --- |
| *9 | 85 db | test | %ebx,%ebx | Checking if the ebx register is 0 |
| *b | 74 34 | je | 3c | If the ebx register is 0, jump to 3c |

Saving return address of the native method

| *d | 8b 44 24 0c | mov | 0xc(%esp),%eax | Placing the return address of the native method in the eax register |
| --- | --- | --- | --- | --- |
| *11 | a3 00 00 00 00 | mov | %eax,caller_ip | Saving the value of the eax register into the variant caller_ip |

Replacing the return address

| *16 | b8 00 00 00 00 | mov | epilog,%eax | Placing the address of the epilog template into eax register |
| --- | --- | --- | --- | --- |
| *1b | 89 44 24 0c | mov | %eax,0xc(%esp) | Seting the value of the eax register as the return address |

Recording TimeStamp

| *1f | 0f 31 | rdtsc | | Reading the value of the TimeStamp counter into the eax register and the edx register |
| --- | --- | --- | --- | --- |
| *21 | a3 00 00 00 00 | mov | %eax,timestamp_low | Placing the value of the eax register to the variant timestamp_low |
| *26 | 89 d0 | mov | %edx,%eax | Placing the value of the edx register to eax register |
| *28 | a3 00 00 00 00 | mov | %eax,timestamp_high | Placing the value of the eax register to the variant timestamp_high | executing self-defined prolog profiling method

| *2d | 68 00 00 00 00 | pushl | index | Stacking index of the native method |
| --- | --- | --- | --- | --- |
| *32 | bb 00 00 00 00 | mov | callback,%ebx | Placing the address of the self-defined prolog profiling method to the ebx register |
| *37 | ff 13 | call | *(%ebx) | executing self-defined prolog profiling method |
| *39 | 83 c4 04 | add | $0x4,%esp | Popping out |

TABLE 1-continued assembly codes of the prolog template and the corresponding explanations

| | | | | |
|---|---|---|---|---|
| | | | | the previously stacked parameter |
| | | Restoring registers | | |
| *3c | 5b | pop | %ebx | Restoring the ebx register |
| *3d | 5a | pop | %edx | Restoring the edx register |
| *3e | 58 | pop | %eax | Restoring the eax register |
| | | Calling native function | | |
| *3f */ | e9 fc ff ff ff | jmp | target_ip | Jumping to the address of the native method |

TABLE 2

Assembly codes of the epilog template and their corresponding explanations

| | | | | |
|---|---|---|---|---|
| /* *0: | 6a 00 | push | $0x0 | Reserving stack space |
| | | Saving registers | | |
| *2: | 50 | push | %eax | Saving eax register |
| *3: | 52 | push | %edx | Saving edx register |
| *4: | 53 | push | %ebx | Saving ebx register |
| | | Record TimeStamp | | |
| *5: | 0f 31 | rdtsc | | Reading the value of the timestamp counter into the eax and edx register |
| *7: | a3 00 00 00 00 | mov | %eax,timestamp_low | Placing the value of the eax register to the variant timestamp_low |
| *c: | 89 d0 | mov | %edx,%eax | Placing the value of the edx register to eax register |
| *e | a3 00 00 00 00 | mov | %eax,timestamp_high | Placing the value of the eax register to the variant timestamp_high |
| | | Returning the return address | | |
| *13 | a1 00 00 00 00 | mov | caller_ip,%eax | Placing the saved return address in the eax register |
| *18 | 89 44 24 0c | mov | %eax,0xc(%esp) | Replacing the return address with the value of the eax register |
| | | calling self-defined epilog profiling method | | |
| *1c | 68 00 00 00 00 | pushl | index | Stacking index of the native method |
| *21 | bb 00 00 00 00 | mov | callback,%ebx | Placing the address of the self-defined epilog profiling method to the ebx register |
| *26 | ff 13 | call | *(%ebx) | executing self-defined epilog profiling method |
| *28 | 83 c4 04 | add | $0x4,%esp | Popping out the previously stacked parameter |
| | | Restore the register | | |
| *2b | 5b | pop | %ebx | Restoring the ebx register |
| *2c | 5a | pop | %edx | Restoring the edx register |
| *2d | 58 | pop | %eax | Restoring the eax register |
| | | Returning to the call method calling the native method | | |
| *2e */ | c3 | ret | | Returning to the call method |

From the above example of generic profiling template and Table 1 and Table 2, it can be seen that, in the generic profiling template, there are multiple codes (as underlined) required to be determined when calling the native method, these codes corresponding to the parameters (shown in bold fonts) in the assembly codes. These codes and parameters to be determined and operation of the generic profiling template copy are described in more detail in the following context.

Then, at step 202, the information required for profiling the native method call is filled into the corresponding location in the profiling template copy.

The profiling copy, obtained from a generic profiling template at step 201, is a copy of the generic profiling template, which includes several codes to be determined. Relevant information for determining these codes is just the information desired for profiling the native method call, the information including:

address of the native method, corresponding to the variant "target_ip" of the assembly codes in table 1, which shall be set as a value of a parameter "address" returned by for example the NativeMethodBind event. It is necessary to call native method in the profiling template copy, thus it is essential to obtain the native method address. The native method address is provided by a native method call-associated event, for example a NativeMethodBind event.

address of a profiling switch, corresponding to "active" of the assembly codes of Table 1. The profiling switch is a parameter for determining whether to execute the profiling. A user interface may be provided to the developer or the user so as to input the native method in his/her concern (or not in his/her concern), and then value is assigned to the switch at this step by determining whether the called native method is in the user's concern or not. In this way, it is feasible to determine whether to profile based on the value of the profiling switch in the profiling template, such that the developer or the user can profile merely the concerned native methods, or does not profile the methods not concerned, thereby providing the developer more convenience and flexibility for profiling. The address of the profiling switch is optional, which is not necessary if the profiling is not executed in a selective way.

address for storing the native method return address, corresponding to the variant "caller_ip" of the assembly codes in table 1. If it is required to perform epilog profiling for the native method call, it is necessary to execute an epilog template copy after completing the native method call, thus a space for storing the native method return address is required to replace the return address with the address of the epilog template. The address for storing the native method return address is optional, which is not necessary if the epilog profiling is not performed.

address of the profiling template copy, in particular the address of the epilog template copy which is needed to be filled in the prolog template copy if an epilog profiling is required, corresponding to the variant "epilog" of the assembly codes in table 1, so as to be capable of executing the epilog profiling after the native method call is completed. The address of the profiling template copy is optional, which is not necessary if the epilog profiling is not performed.

addresses storing various profiling information (such as the start time and end time of the native method call, and the call times of the native method), for example the variants "timestamp_low" and "timestamp_high" of the assembly codes as shown in table 1 and table 2. This address designates the initial address for a space storing various information obtained during the profiling process, and the stored information can be exported from the space at an appropriate time. The address for storing various information about profiling can be varied as required by profiling, and the address for storing corresponding information can be not included in the case of not requiring performing corresponding profiling.

address of self-defined prolog profiling method, corresponding to the variant "callback" in the assembly codes of table 1, the address designating the initial address of the space for storing self-defined prolog profiling method. The address for self-defined prolog profiling method is optional, which may not be included in case of not performing self-defined prolog profiling.

address for self-defined epilog profiling method, corresponding to the variant "callback" in the assembly codes of table 2, the address designating the initial address of the space for storing self-defined epilog profiling method. The address for self-defined epilog profiling method is optional, which may not be included in case of not performing self-defined epilog profiling.

index of native method for identifying different native methods, corresponding to the variant "index" in the assembly codes of table 1 and table 2, which may act as the parameter for self-defined prolog profiling and/or self-defined epilog profiling, such that different profiling can be performed to different native methods. The index is not necessary in case of not requiring performing different profiling to different native methods.

In this step, the above information is written into the corresponding positions in the profiling template copy, for example, the underlined locations of the above profiling templates.

It should be noted that not all of the above information is essential, one or more of which can be selected according to the application.

Then, at step 203, the code execution flow is changed so as to perform the profiling template copy.

If it is required to profile a native method call, it needs performing some work relevant to profiling before and/or after calling the native method. Thus, the original code execution flow needs to be changed, i.e. inserting profiling associated codes in the execution path, so as to execute profiling template copy before and/or after executing the native method call.

In the case of for example JVM, as the above described, the NativeMethodBind event provided by JVMTI has a function of replacing the address of the native method with the new address parameter (new_address_ptr). Thus, change of code execution flow can be realized by designating the new address parameter as the address of the profiling template copy of the present invention, in particular the address of the prolog profiling template copy.

Besides, the code execution flow can be changed by modifying the initial bytes of the native method code as codes jumping to the profiling template copy before executing the native method call and restoring the initial bytes of the native method code before starting the native method call.

In an exemplary embodiment according to the present invention, firstly, the initial bytes of the native method code are copied and stored at an appropriate location. The number of initial bytes at least equals to the number of bytes of the code necessary for implementing jumping to the profiling template copy, i.e. the number of bytes necessary for jumping instruction plus the number of bytes of the initial address of the profiling template copy. For example, for a 32-bit X86 CPU, the jumping instruction needs 1 byte, and the address needs 4 bytes (32 bit), thus at least the initial 5 bytes are copied.

It should be noted that since the number of bytes and the address bytes necessary for implementing the jumping instruction are different for different instruction systems and CPUs with different address bytes, the number of the bytes to be copied is also different. And then, for example, the known mprotect( ) system call provided by the operating system can be used to remove the write protection of the page where the native method is located. Next, the initial bytes are modified as the codes jumping to the profiling template copy. Thereafter, in the prolog template copy, the initial bytes of the native method code can be restored from the pre-stored initial bytes before calling the native method. In this way, change of code execution flow is enabled. In the case that the native method address is not allowed to be changed, this manner is particularly advantageous. Further, if the native method call-associated event can not provide the function of changing the native address method, this method can be used to change the code execution flow.

Operations of the above steps 202 and 203 can be implemented by a wrapper realized in C/C++ programming language as shown below.

```
Example of Wrapper
int
JNIWrapper_Do (jvmtiEnv *jvmti, jmethodID method, void*
address, void** newAddress)
{
unsigned char *p;
TJNIRecord* pjc;
int i;
    unsigned char str; // for the user to designate the concerned
       method name
i = idxJniFunc;
pjc = &JNIRecords[i];
pjc->addrJniFunc = (unsigned long)address;
//Obtaining the native method name according to the MethodID
err = (jvmtiError)jvmti->GetMethodName(methodID,
(char**)&pMethodName, (char**)&pSignature, (char**)&pGeneric);
    if (err == JVMTI_ERROR_NONE) {
        if (pMethodName != NULL) {
    // switching on the profiling switch if the method name includes
characters in the variant 'str',
            if( strstr(pMethodName, str )==NULL) return 0;
            else{
                sprintf(JNIRecords[idxJniFunc].name, "%s",
pMethodName);
                pjc->active = 1;
            }
        //releasing the memory occupied by the native method
            jvmti->Deallocate((unsigned char*)pMethodName);
        }
    }
p = &pjc->prolog[0];
// copying prolog template
memcpy(p, prologTemplate, SIZE_OF_PROLOG);
// filling in the prolog template copy information
// filling in the address storing profiling switch
*(unsigned int*)(p + 5) += (unsigned int)(&pjc->active);
// filling in the address for saving the return address
*(unsigned int*)(p + 18) += (unsigned int)(&pjc->addrCaller);
// filling in epilog template copy address
*(unsigned int*)(p + 23) += (unsigned int)(&pjc->epilog[0]);
// filling in address for saving the timestamp_low 32 bit
*(unsigned int*)(p + 34) += (unsigned int)(&pjc->timeEnter);
// filling in address for saving the timestamp_high 32 bit
*(unsigned int*)(p + 41) += (unsigned int)(&pjc->timeEnter) + 4;
// filling in index for the native method
*(unsigned int*)(p + 46) += i;
// filling in the address of the self-defined prolog profiling method
*(unsigned int*)(p + 51) += (int)(&pfCallbackEnterNative);
// filling in the native method address
*(unsigned int*)(p + 64) += (int)address - (int)(p + 64);
p = &pjc->epilog[0];
// copying epilog template
memcpy(p, epilogTemplate, SIZE_OF_EPILOG);
// filling in the epilog template copy information
// filling in address for saving the timestamp_low 32 bit
*(unsigned int*)(p + 8) += (unsigned int)(&pjc->timeLeave);
// filling in address for saving the timestamp_high 32 bit
*(unsigned int*)(p + 15) += (unsigned int)(&pjc->timeLeave) + 4;
// filling in address for saving the return address
*(unsigned int*)(p + 20) += (int)(&pjc->addrCaller);
// filling in index for the native method
*(unsigned int*)(p + 29) += i;
// filling in the address of the self-defined epilog profiling method
*(unsigned int*)(p + 34) += (int)(&pfCallbackLeaveNative);
// changing the code execution flow
// setting the value of the newAddress as the address of the epilog
template copy
*newAddress = &pjc->prolog[0];
return 0;
}
```

It should be noted that the wrapper as described above is only an example, and the present invention is not limited thereto and can have many variations. For example, the epilog template copy can be firstly copied and filled in, and then the prolog template copy is copied and filled in; or the prolog template and the epilog template can be copied firstly, and then the prolog template copy and the epilog template copy are filled in. Besides, as required by the application, the information required to be filled in may not be limited to the above information, which can be more or less. These variations are all within the scope of the present invention.

Figure 3:
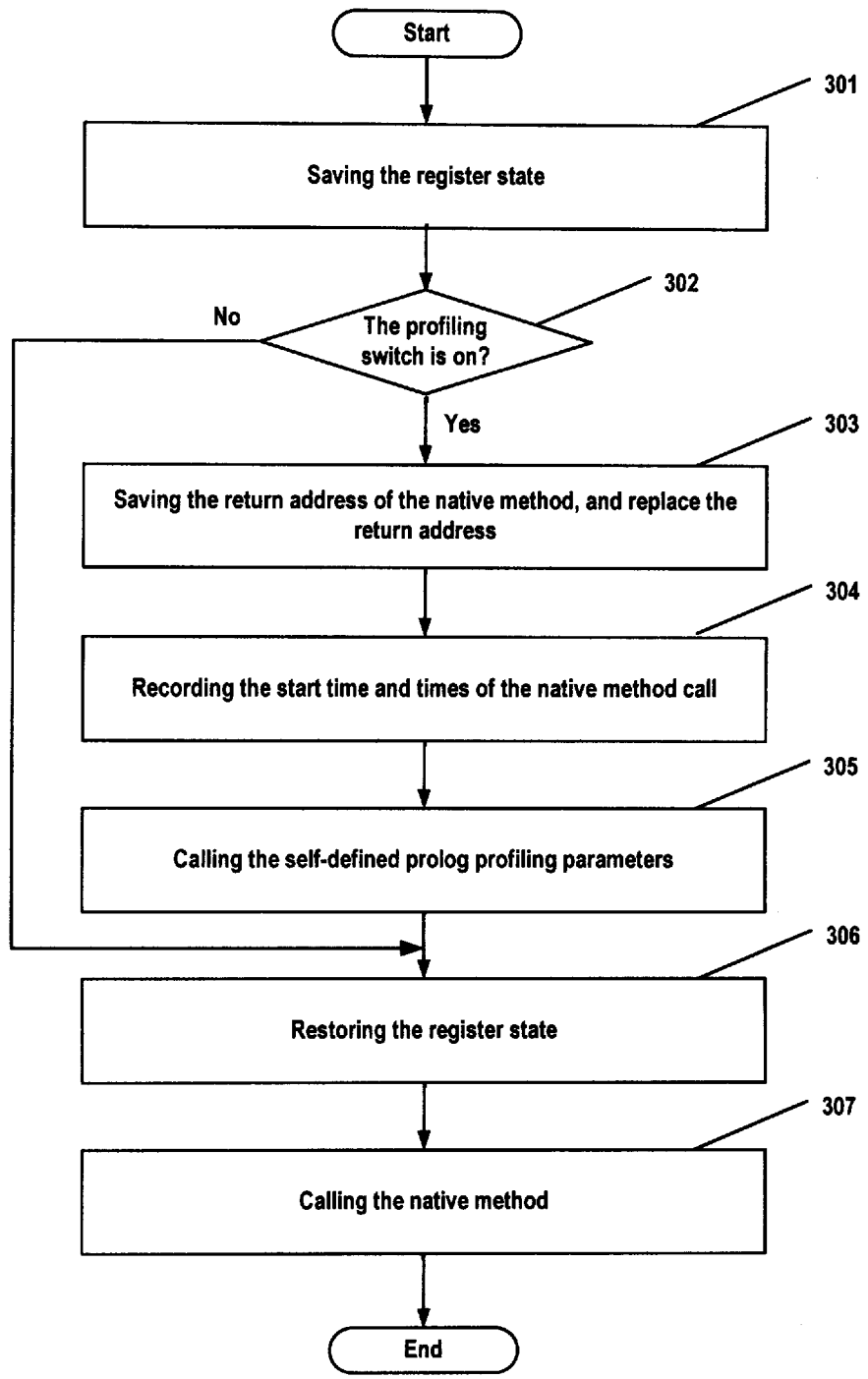
FIG. 3 is a flow chart of operations performed in a prolog template copy according to an embodiment of the present invention.
Figure 4:
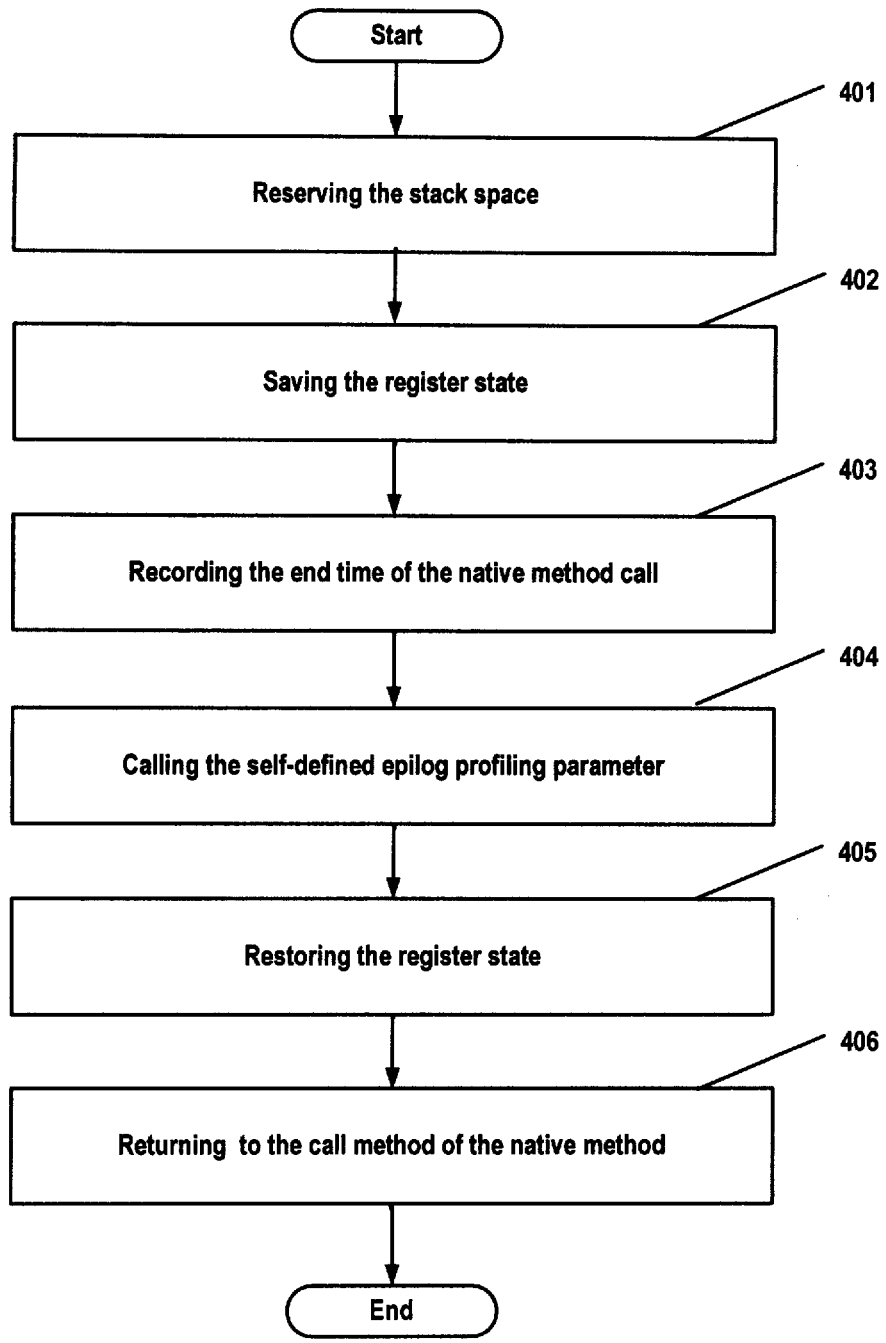
FIG. 4 is a flow chart of operations performed in an epilog template copy according to an embodiment of the present invention.

FIG. 3 and FIG. 4 describe in detail an example of operations executed in the profiling template copy according to an embodiment of the present invention.

FIG. 3 is a flow chart of an operation executed in a prolog template copy according to an embodiment of the present invention.

As shown in FIG. 3, after entering in the profiling template copy which has been filled in at step 301, the current register states, such as the accumulator state, data register state, and basic address register state, etc, are saved to prepare for subsequent profiling related operations, such that the profiling does not affect calling the native method.

Next, at step 302, the value of profiling switch is read out from the address storing the profiling switch, to determine, based on the switch value, whether the profiling switch is on or not. In an embodiment according to the present invention, the title of the native function in (or not in) a developer's concern may be input by the developer via the user interface, and then when filling in information, whether the called native function is the one input by user is determined, based on which the switch value is set.

If it is determined that the profiling switch is on, the flow proceeds to step 303; otherwise the flow proceeds to step 306.

Then, at step 303, the return address of the native method is saved and replaced.

In an embodiment of the present invention, first the return address of the native method is obtained by getting the content of the position at which the stack pointer is located, i.e., the address of the calling method which calls the native method. And then, it is stored at the address for storing the native method return address, which has been filled in at the above step 202. Next, the address of epilog template copy filled in at the above step 202 is used to replace the content at the position at which the stack pointer is located, such that the epilog template copy is executed after the native function call execution is completed.

Then, at step 304, the time and times of calling the native method is recorded. For example, the value of the internal timer of the current CPU can be obtained to get the start time of calling the native method. And the times of calling the native method can also be recorded.

Next, at step 305, the address of the self-defined prolog profiling method, which is filled in at step 202, is obtained, and the self-defined prolog profiling method is called. The self-defined prolog profiling method can be written in for example C/C++ language, for example for recording the times or time of accessing the memory, times, flow rate or time of accessing the network, or the hit rate of CPU cache, etc. Besides, the index of the native method can also act as the parameter of the self-defined profiling method, so as to execute different prolog profiling for different native methods.

Next, at step 306, the register state is restored to the state upon entering the profiling template copy, so as to prepare for executing the calling of the native method.

Then, at step 307, calling the native method is executed.

Next, reference is made to FIG. 4 which shows a flow chart of operations executed in a prolog template copy according to an embodiment of the present invention. Since in the prolog profiling template copy, the return address of the native method is replaced with the address of the epilog template copy, thus after the native method call ends, the epilog template copy will be automatically executed.

As shown in FIG. 4, upon entering in the epilog template copy, firstly at step 401, stack space is reserved in the stack for restoring the return address of the native method (i.e. the address of the calling method for calling the native method).

Then, at step 402, the register state is saved for preparing for profiling-associated operations.

Then, at step 403, the value of the internal timer of the current CPU is obtained so as to get the end time of calling the method.

Next, the position at which the current stack pointer is located, i.e. the reserved stack space, is set as the address of the calling method which calls the native method, i.e. the original return address of the native method.

Then, at step 404, the self-defined epilog profiling method is executed. Similar to the prolog profiling method, the epilog profiling method can be written in for example C/C++ language, for example for recording the times or time of accessing the memory, times, flow rate or time of accessing the network, or the hit rate of CPU cache, etc. Besides, the index of the native method can also act as the parameter of the self-defined profiling method, so as to execute different epilog profiling for different native methods.

Next, at step 405, the register state is restored to the state upon the end of the native method call, and then at step 406, return is executed to return to the calling method of the native method.

Based on the method of the present invention as above described, profiling a native method call can be easily implemented by dynamically inserting assembly-level profiling template copy code in the execution path. Besides, the number of machine instructions added in the execution path is not more than 40, thus profiling a native method call will not notably affect execution of the native method call. Additionally, compared with the prior art, it will not affect JVM components such as the class loader, JIT compiler, etc. Further, during the profiling process, it will not trigger interruption process and system call, and has little influence on the system performance.

In order to examine the influence of the method of the present invention on the system performance, the inventor performs profiling on the application Complier.compiler with the most intensive I/O operations in the Java virtual machine benchmark program SPECjvm2008 issued by Standard Performance Evaluation Corporation (SPEC), which turns out that without the profiling, the operation numbers per second is 515.45 in average, whereas in the case of executing profiling, the operation number per second is 504.68 per second. It is seen that, compared with the prior art, the method of the present invention has rather trivial influence on the system performance operation.

Hereinabove, the method provided by the present invention has been described in detail with reference to FIGS. 2 to 4, the example of profiling templates, and the example of wrapper. It should be noted that the above description is only for illustrative purpose and the present invention is not limited thereto. Based on the application requirement, the method of the present invention may have many embodiments.

In the embodiments described above, the profiling template includes a prolog profiling template and an epilog profiling template, but the present invention is not limited thereto. The profiling template can be designed as required by profiling. In another embodiment of the present invention, the native method call is only subject to prolog profiling, thus it would be unnecessary to copy the epilog profiling template. In this situation, the step of executing saving the return address of the native method and the step of replacing the return address of the native method with the epilog template copy may be omitted. While in other embodiments, the native method call is only subject to epilog profiling, which only needs the step of saving the return address of the native method and the step of replacing it with the epilog template copy before calling the native method.

Further, in a further embodiment of the present invention, there is no self-defined prolog profiling method and/or self-defined epilog profiling method. It is also allowed to only implement recording the times of the native method call and/or recording the start time and end time of calling the native method call. Moreover, recording the times of the native method call can be executed either in the prolog template copy or in the epilog template copy. Besides, when execution of profiling does not change the register state, the steps of executing and restoring the register state can be omitted.

Further, in the above described embodiment of the present invention, it is in the prolog template copy that the value of the profiling switch is determined and then whether to execute profiling is determined. However, the skilled in the art should appreciate that, after the native method-associated time for example the NativeMethodBind event is started, the value of the profiling switch may be determined first. The subsequent steps of copying the profiling copy and filling in information can not be executed unless it is determined that the profiling switch is on. Further, in the step of filling in information, the value of the profiling switch may be determined first, and the subsequent steps of filling in and changing the code execution flow can not be executed unless it is determined that the profiling switch is on.

It should be noted that all of the above described variations and other variations conceivable to the skilled in the art fall within the scope of the present invention.

Figure 5:
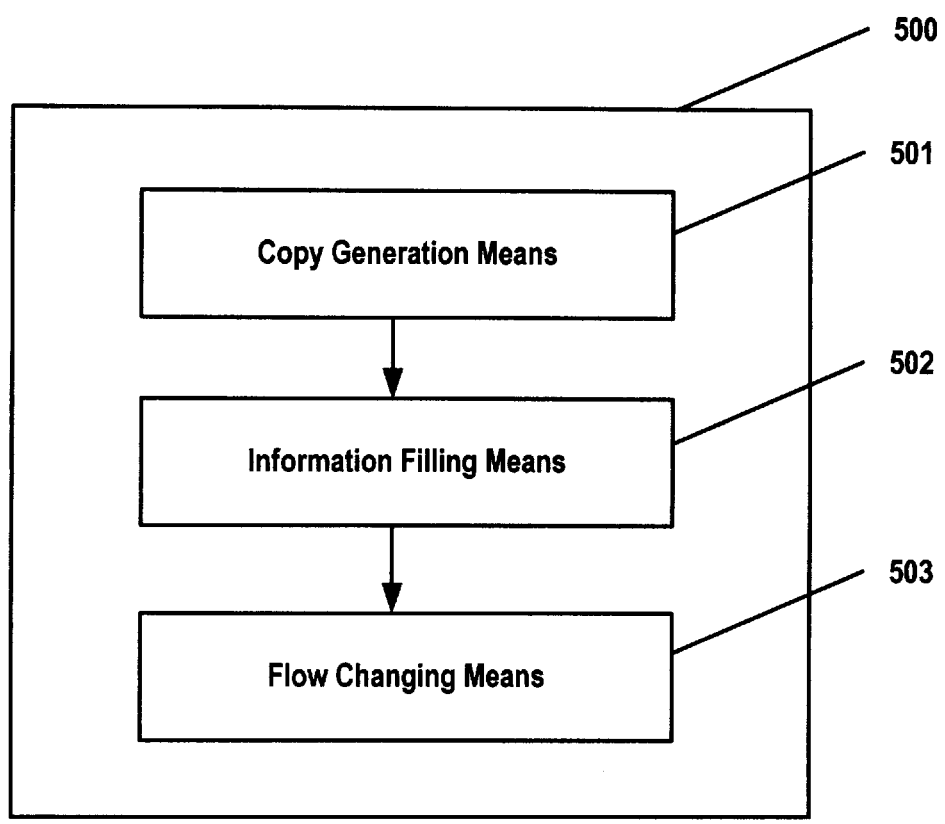
FIG. 5 shows an apparatus for profiling a native method call according to an embodiment of the present invention.

Hereinafter, the embodiment of the apparatus of the present invention is described with reference to FIG. 5. FIG. 5 shows an apparatus 500 for profiling a native method call according to an embodiment of the present invention.

As shown in FIG. 5, the apparatus 500 includes: copy generation means 501, for generating, in response to a native method call-associated event, a profiling template copy from a generic profiling template for profiling a native method call; information filling means 502 for filling the information required for profiling the native method call in corresponding positions in the profiling template copy; and flow changing means 503, for changing the code execution flow, so as to execute the profiling template copy.

According to an embodiment of the present invention, the profiling template copy may include the prolog template copy for profiling before starting the native method call. The prolog template copy is for executing prolog profiling for the native method call, and calling the native method.

According to another embodiment of the present invention, the prolog template copy may be further implemented for: saving the register state; one or more of determining the profiling switch, recording the times of the native method call, and executing the self-defined epilog profiling method; and restoring the register state.

According to further embodiment of the present invention, the profiling template copy may further include the epilog template copy for profiling after the native method call is completed. In the embodiment, the return address of the native method call is replaced with the address of the epilog template copy before executing the native method call, such that the epilog template copy is executed after calling the native method is completed. In the embodiment, the epilog template copy may be used to execute epilog profiling for the native method call and restoring the return address of the native method call, so as to return to the calling method which calls the native method after the epilog template copy is executed.

According to still further embodiment of the present invention, the prolog template copy may be further used to record the start time of the native method call, and the epilog template copy may be further used to record the end time of calling the native method.

According to another embodiment of the present invention, the epilog template copy may be further used to save the register state; execute self-defined epilog profiling method; and restore the register state.

According to further embodiment of the present invention, the information required to profile the native method call may include one or more of: the address of the native method; the address storing the return address of the native method; the address of the profiling template copy; the address of the profiling switch value; the address storing various information on profiling; the index for native method; the address of a self-defined prolog profiling method; and the address of a self-defined epilog profiling method.

According to still further embodiment of the present invention, the native method call associated event may be NativeMethodBind event provided by Java virtual machine tool interface. In the case of this embodiment, the flow changing means 503 can change the code execution flow by setting the new address parameter of the NativeMethodBind event as the address of the profiling template copy.

According to yet further embodiment of the present invention, the flow changing means 503 may be used to change the code execution flow by modifying the initial bytes of the code of the native method as jumping to the profiling template copy and restoring the initial bytes of the code of the native method before starting the native method call.

As to the specific operations of copy generation means 501, information filling means 502 and flow changing means 503 in the above embodiments, reference may be taken to the above description on the method of the present invention in conjunction with FIGS. 2 to 4.

The apparatus according to the present invention, when the native method is called, profiles the native method by dynamically inserting the profiling template copy in the execution path at the assembly level. Thus, with respect to the prior art, it is unnecessary for the apparatus according to the present invention to provide an associated proxy for each native method, thus it has a high feasibility and barely affects the system performance.

Figure 6:
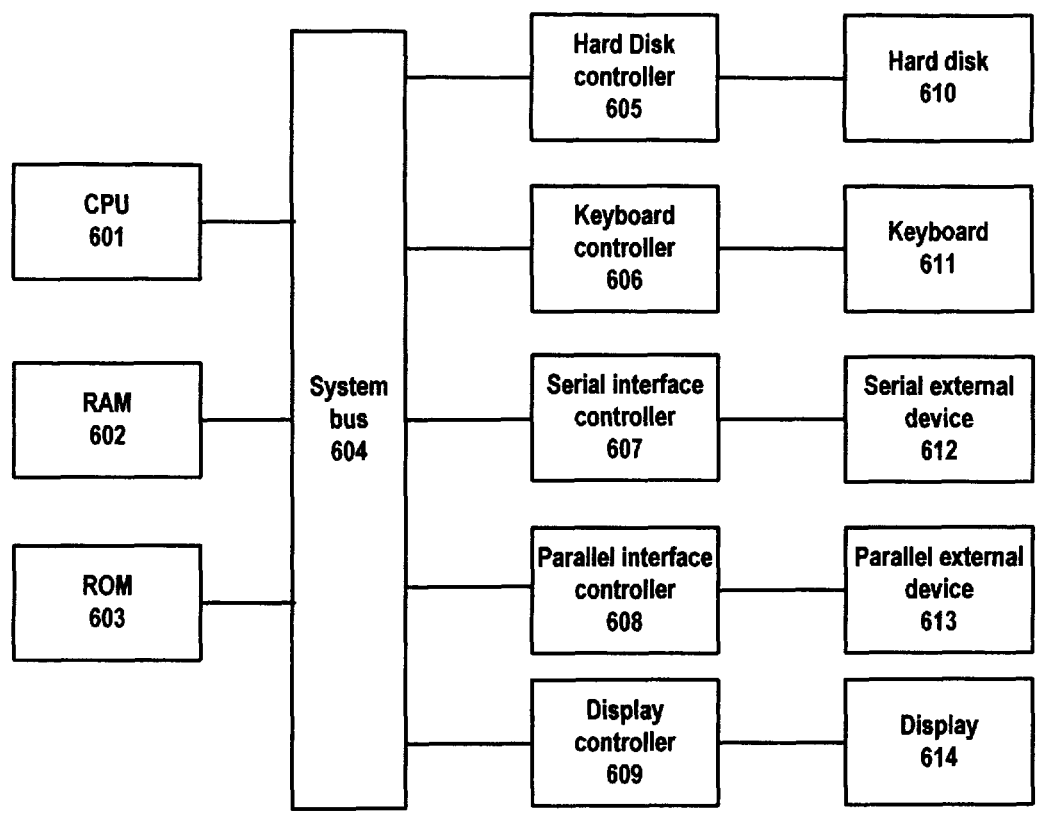
FIG. 6 is an exemplary structural block diagram showing a computer system capable of implementing an embodiment according to the present invention.

Hereinafter, reference will be made to FIG. 6 to describe a computer device in which the present invention can be implemented. FIG. 6 schematically shows a structural block diagram of a computing device configured to implement the embodiments according to the present invention.

The computer system as shown in FIG. 6 includes a CPU (Central Processing Unit) 601, a RAM (Random Access Memory) 602, a ROM (Read Only Memory) 603, a system bus 604, a hard disk controller 605, a keyboard controller 606, a serial interface controller 607, a parallel interface controller 608, a monitor controller 609, a hard disk 610, a keyboard 611, a serial peripheral device 612, a parallel peripheral device 613 and a display 614. Among these components, connected to the system bus 604 are the CPU 601, the RAM 602, the ROM 603, the hard disk controller 605, the keyboard controller 606, the serial interface controller 607, the parallel interface controller 608 and the display controller 609. The hard disk 610 is connected to the hard disk controller 605; the keyboard 611 is connected to the keyboard controller 606; the serial peripheral device 612 is connected to the serial interface controller 607; the parallel peripheral device 613 is connected to the parallel interface controller 608; and the display 614 is connected to the display controller 609.

The structural block diagram in FIG. 6 is shown only for illustration purpose, and is not intended to limit the scope of the present invention. In some cases, some devices can be added or reduced as required.

Further, the embodiments of the present invention can be implemented in software, hardware, or the combination thereof. The hardware part can be implemented by a special logic; the software part can be stored in a memory and executed by a proper instruction execution system such as a microprocessor or a dedicated designed hardware.

While the embodiments of the present invention considered by far have been referred to describe this invention, it should be understood that this invention should not be limited to the embodiments disclosed herein. On the contrary, all modifications and equivalent arrangements that come within the spirit and range of the appended claims are intended to be embraced therein. The scope of the appended claims is accorded with the broadest interpretation to encompass all such modifications and equivalent structures and functions.

What is claimed is:

1. A method, implemented in an electronic data processing system, for profiling a native method call, comprising the steps of:
   generating a profiling template copy from a generic profiling template for profiling the native method call, in response to a native method call-associated event, the profiling template copy comprises an epilog template copy for profiling after the native method call is completed;
   filling information required for profiling the native method call in corresponding locations in the profiling template copy; and
   changing a code execution flow to execute the profiling template copy
   replacing a return address of the native method call with an address of the epilog template copy before executing the native method call, so that the epilog template copy is executed after the native method call is completed; and
   using the epilog template copy for performing the steps of (i) executing an epilog profiling for the native method call and (ii) restoring the return address of the native method call to return to the calling method which calls the native method after executing the epilog template copy.

2. A method according to claim 1 wherein:
   the profiling template copy comprises a prolog template copy for profiling before the native method call is started, the prolog template copy being used for performing the steps of (i) executing a prolog profiling for the native method call and (ii) calling the native method.

3. A method according to claim 2, wherein the step of executing the prolog profiling for the native method call comprises:
   saving a register state;
   performing at least one of the steps of (i) determining profiling switch, (ii) recording times of the native method call, and (iii) executing a self-defined prolog profiling method; and
   restoring the register state.

4. A method according to claim 1, wherein:
   the step of executing the prolog profiling for the native method call further comprises recording start time of the native method call; and the step of executing the epilog profiling for the native method call further comprises recording end time of the native method call.

5. A method according to claim 1, wherein the step of executing the epilog profiling for the native method call further comprises:
    saving a register state;
    executing a self-defined epilog profiling method; and
    restoring the register state.

6. A method according to claim 1, wherein the information used for profiling the native method call comprises at least one of:
    address of native method;
    address storing the return address of the native method;
    address of the profiling template copy;
    address of a profiling switch;
    address storing various information about profiling;
    index for the native method;
    address of self-defined prolog profiling method; and
    address of self-defined epilog profiling method.

7. A method according to claim 1, wherein the native method call-associated event is a NativeMethodBind event provided by the Java virtual machine tool interface.

8. A method according to claim 7, wherein a code execution flow is changed by setting the new address parameter of the NativeMethodBind event as the address of the profiling template copy.

9. A method according to claim 1, wherein the code execution flow is changed by modifying the initial bytes of the code of the native method as a code jumping to the profiling template copy and restoring the initial bytes of the code of the native method before starting the native method call.

10. A computer program product embodied in a non-transitory computer readable storage medium comprising:
    computer readable program codes coupled to the non-transitory computer readable storage medium for profiling a native method call, the computer readable program codes configured to cause the program to:
        generate a profiling template copy from a generic profiling template for profiling the native method call, in response to a native method call-associated event, the profiling template copy including an epilog template copy for profiling after the native method call is completed;
        fill information required for profiling the native method call in corresponding locations in the profiling template copy; and
        change a code execution flow to execute the profiling template copy
        replace a return address of the native method call with an address of the epilog template copy before executing the native method call, so that the epilog template copy is executed after the native method call is completed; and
        use the epilog template copy for performing the steps of (i) executing an epilog profiling for the native method call and (ii) restoring the return address of the native method call to return to the calling method which calls the native method after executing the epilog template copy.

11. A computer program product according to claim 10 wherein:
    the profiling template copy comprises a prolog template copy for profiling before the native method call is started, the prolog template copy being used for performing the steps of (i) executing a prolog profiling for the native method call and (ii) calling the native method.

12. A computer program product according to claim 10, computer readable program codes to execute the prolog profiling for the native method call comprises computer readable program codes configured to:
    save a register state;
    perform at least one of the steps of (i) determining profiling switch, (ii) recording times of the native method call, and (iii) executing a self-defined prolog profiling method; and
    restore the register state.

13. A computer program product according to claim 10, wherein:
    the computer readable program codes to execute the prolog profiling for the native method call further comprises computer readable program codes to record start time of the native method call; and
    the computer readable program codes to execute the epilog profiling for the native method call further comprises computer readable program codes to record end time of the native method call.

14. A computer program product according to claim 10, wherein the computer readable program codes to execute the epilog profiling for the native method call further comprises computer readable program codes to:
    save a register state;
    execute a self-defined epilog profiling method; and
    restore the register state.

15. A computer program product according to claim 10, wherein the information used for profiling the native method call comprises at least one of:
    address of native method;
    address storing the return address of the native method;
    address of the profiling template copy;
    address of a profiling switch;
    address storing various information about profiling;
    index for the native method;
    address of self-defined prolog profiling method; and
    address of self-defined epilog profiling method.

16. A computer program product according to claim 10, wherein the native method call-associated event is a NativeMethodBind event provided by the Java virtual machine tool interface.

17. A computer program product according to claim 16, wherein a code execution flow is changed by setting the new address parameter of the NativeMethodBind event as the address of the profiling template copy.

18. A computer program product according to claim 10, wherein the code execution flow is changed by modifying the initial bytes of the code of the native method as a code jumping to the profiling template copy and restoring the initial bytes of the code of the native method before starting the native method call.

* * * * *